US012582854B2

(12) United States Patent
Lee

(10) Patent No.: US 12,582,854 B2
(45) Date of Patent: Mar. 24, 2026

(54) AIR SUCTION-TYPE FIRE DETECTION SYSTEM CAPABLE OF EARLY DETECTION OF A FIRE LOCATION THROUGH SMOKE CONCENTRATION MONITORING AND DETECTION METHOD THEREOF

(71) Applicant: ALLLITELIFE CO., LTD., Anyang-si (KR)

(72) Inventor: Young Man Lee, Anyang-si (KR)

(73) Assignee: ALLLITELIFE CO., LTD., Anyang-si (KR)

( * ) Notice: Subject to any disclaimer, the term of this patent is extended or adjusted under 35 U.S.C. 154(b) by 340 days.

(21) Appl. No.: 18/319,207

(22) Filed: May 17, 2023

(65) Prior Publication Data

US 2023/0372750 A1 Nov. 23, 2023

(30) Foreign Application Priority Data

May 23, 2022 (KR) ........................ 10-2022-0062894

(51) Int. Cl.

| | |
|---|---|
| ***G08B 17/10*** | (2006.01) |
| ***A62C 3/00*** | (2006.01) |
| ***A62C 37/36*** | (2006.01) |
| ***A62C 99/00*** | (2010.01) |
| ***G08B 25/01*** | (2006.01) |

(52) U.S. Cl.

CPC .............. *A62C 3/002* (2013.01); *A62C 37/04* (2013.01); *A62C 99/009* (2013.01); *G08B 17/10* (2013.01); *G08B 25/016* (2013.01)

(58) Field of Classification Search

CPC ....... A62C 3/002; A62C 37/04; A62C 99/009; B01D 46/10; B03C 3/0175; G01F 1/66; G01N 1/24; G01N 1/26; G01N 33/0036; G08B 17/00; G08B 17/06; G08B 17/10; G08B 17/107; G08B 17/117; G08B 25/016; G08B 25/10; G08B 25/14; G08B 29/185

USPC .......................................................... 340/628

See application file for complete search history.

(56) References Cited

U.S. PATENT DOCUMENTS

| | | | | |
|---|---|---|---|---|
| 2012/0133518 A1* | 5/2012 | Russwurm | G08B 29/18 | 340/628 |
| 2016/0153897 A1* | 6/2016 | Takimoto | G01N 21/61 | 356/435 |

FOREIGN PATENT DOCUMENTS

| | | | |
|---|---|---|---|
| CN | 104464166 A * | 3/2015 | G08B 17/117 |
| KR | 10-1544383 B1 | 7/2014 | |
| KR | 10-1531656 B1 | 4/2015 | |

(Continued)

*Primary Examiner* — Stephen R Burgdorf

(74) *Attorney, Agent, or Firm* — NKL LAW; Jae Youn Kim

(57) ABSTRACT

Provided is an air suction-type fire detection system and a detection method thereof, which are capable of early detection of a fire location through smoke concentration monitoring. Particularly, in the system, an air suction-type fire detection system capable for early detection of a fire location through smoke concentration monitoring, the air suction-type fire detection system are provided, which includes: an air suction-type fire detector that is fitted to the outside of a chamber needing fire detection and detects fire through an inflow of air inside a warehouse; a suction line that is fitted to the inside of the warehouse and sucks air inside the warehouse in real time; a connection line that links the suction line and the fire detector; and a pump that is furnished in one side of the connection line and supplies power to draw air from inside the warehouse into the suction line.

4 Claims, 12 Drawing Sheets

(56) References Cited

FOREIGN PATENT DOCUMENTS

| | | | | | |
|---|---|---|---|---|---|
| KR | 10-1630783 | B1 | | 6/2015 | |
| KR | 10-1672899 | B1 | | 9/2016 | |
| KR | 20210054232 | A | * | 5/2021 | ............. G08B 25/10 |

* cited by examiner

AIR SUCTION-TYPE FIRE DETECTION SYSTEM CAPABLE OF EARLY DETECTION OF A FIRE LOCATION THROUGH SMOKE CONCENTRATION MONITORING AND DETECTION METHOD THEREOF

CROSS-REFERENCE TO RELATED APPLICATIONS

This application claims priority to and the benefit of Korea Patent Application No. 10-2022-0062894 filed in the Korean Intellectual Property Office on May 23, 2022, the contents of which are incorporated herein by reference in their entirety.

BACKGROUND

Technical Field

The present disclosure relates to an air suction-type fire detection system and a detection method thereof, which are capable of early detection of a fire location through smoke concentration monitoring. In particular, the present disclosure relates to an air suction-type fire detection system capable of early detection of a fire location through smoke concentration monitoring. This system is designed to be fitted in various locations such as ESS rooms, server rooms, freezing warehouses and clean rooms, and other areas where it may not be possible to install a fire detector inside. It enables early and accurate determination of whether a fire have broken out, as well as the location of the fire.

Related Art

In a freezing warehouse with a closed chamber, dry air flows quickly due to an air conditioning system. However, in the event of a fire, the aforementioned conditions in the freezing warehouse can cause the fire to spread quickly. Therefore, early detection of the fire is crucial in order to minimize damage and loss to the warehouse.

FIG. 1A and FIG. 1B show examples of an air suction-type fire detection system being applied to an ESS room, while FIG. 2 shows an example of the same system being applied to a private house.

FIG. 3 shows a schematic diagram of an air suction-type fire detection system 1 installed in a freezing warehouse. As shown in FIG. 3, an air suction-type fire detector 10 is commonly employed in a freezing warehouse 2.

It is seen that such a prior air suction-type fire detection system 1 is configured to include a suction line 20, a connection line that links the suction line 20 and the fire detector 10, and a suction pump 31 that is furnished on one side of the connection line, which supplies power to draw air from inside the warehouse 2 into the suction line.

Further, the fire detector 10 is configured to determine whether or not a fire breaks out by detecting smoke from the air inside the warehouse, drawn through the suction line 20, in real time.

However, when a fire breaks out in the freezing warehouse 2, such an existing air suction-type fire detection system 1 just determines whether or not fire actually happened or not by detecting smoke but fails to identify a fire location.

Therefore, in respect of the air suction-type fire detection system, it is required to develop an improved air suction-type fire detection system that is capable of identifying a fire location, as well as an existence of fire.

RELATED ART DOCUMENT

Patent Document (Patent Document 1) Korean Patent No. 1672899
(Patent Document 2) Korean Patent No. 1630783
(Patent Document 3) Korean Patent No. 1544383
(Patent Document 4) Korean Patent No. 1531656

SUMMARY

Technical Problem

Therefore, the present disclosure is contrived to overcome conventional problems as described above. According to the present disclosure, an air suction-type fire detection system is provided for preventing fire in a chamber, such as a freezing warehouse or an ESS room. The system aims to detect fire based on smoke concentration change graphs and identify the location of the fire at the same time.

According to the present disclosure, it aims at providing an air suction-type fire detection system and a detection method thereof, which are allowable to determine whether or not a fire breaks out by comparing and analyzing a smoke concentration change graph measured in real time and pre-stored and databased smoke concentration change graphs depending on fire locations and to identify a fire location at the same time.

According to the present disclosure, an air suction-type fire detection system is aimed to provide early detection of the location of a fire through smoke concentration monitoring and a detection method that can accurately detect the location of a fire by following steps: detecting a fire when the smoke concentration reaches a set value or more; opening and closing a damper to discharge smoke inside a suction line and accurately match the smoke concentration change graphs in the database; operating a suction pump in the positive direction again to measure the change in smoke concentration; and comparing the patterns and slopes of the measured smoke concentration change graph with those of smoke concentration graphs that depend on fire locations and are stored in the database.

Meanwhile, technical objects to be achieved in the present invention are not limited to the aforementioned technical objects, and other technical objects, which are not mentioned above, will be apparently understood to a person having ordinary skill in the art from the following description.

Technical Solution

A first aspect of the present disclosure may be achieved by an air suction-type fire detection system capable for early detection of a fire location through smoke concentration monitoring, the air suction-type fire detection system including: an air suction-type fire detector that is fitted to the outside of a chamber needing fire detection and detects fire through an inflow of air inside a warehouse; a suction line that is fitted to the inside of the warehouse and sucks air inside the warehouse in real time; a connection line that links the suction line and the fire detector; and a pump that is furnished on one side of the connection line and supplies power to draw air from inside the warehouse into the suction line. The air suction-type fire detector discharges smoke inside the suction line when a smoke concentration exceeds a set concentration value, sucks air again through the suction line and then determines an existence of fire and a fire location by measuring a change in a smoke concentration in the drawn air in real time.

In addition, in the suction line, one end is configured with an open and shut damper, another end is connected with the connection line, and an outer surface has a plurality of suctions holes spaced apart from each other in a certain interval.

Further, the air suction-type fire detector includes: a measurement portion that measures a smoke concentration in air to be drawn in real time; and a determination portion that determines an existence of fire and a fire location based on the smoke concentration change graph measured in the measurement portion, wherein the smoke concentration change graph is measured, which has a different slope depending on a position of the suction hole into which smoke is initially drawn.

In addition, as the position of the suction hole into which smoke is initially drawn is further away from a closed surface, a slope value in the smoke concentration change becomes increased.

Further, the air suction-type fire detector includes: a monitoring portion that displays the smoke concentration change graph measured in real time; and a database portion that stores pre-measured smoke concentration change graphs depending on fire locations and creates a database, wherein the determination portion matches the measured smoke concentration change graph with the smoke concentration change graphs depending on fire locations, stored in the database to determine a fire location.

In addition, the smoke concentration change graphs, stored in the database are those in a state that the smoke is initially drawn into the plurality of suction holes, respectively.

Further, when a smoke concentration measured in the measurement portion exceeds a pre-set concentration value, the determination portion determines that a fire has broken out, a control portion controlling the open and shut damper to open, the pump to be operated as a blower to discharge smoke inside the suction line and the pump to be operated as a suction pump again. The determination portion compares a smoke concentration change graph measured from the time that the suction pump has been operated again with the smoke concentration change graphs depending on fire locations stored in the database, and determines a fire location.

In addition, the air suction-type fire detection system capable for early detection of a fire location through smoke concentration monitoring further includes: a communication unit that transmits to a user terminal the smoke concentration change graph displayed on the monitoring portion, and fire location information and information as to whether or not a fire breaks out determined in the fire detector.

A second aspect of the present disclosure may be achieved by an air suction-type fire detection method capable of early detection of a fire location through smoke concentration monitoring, the fire detection method using an air suction-type fire detector including steps of: storing smoke concentration change graphs depending on fire locations for respective states where the smoke is initially drawn into each suction hole in a plurality of suction holes formed on a suction line and creating a database; operating a pump as a suction pump to suck in air inside a chamber through the suction hole of the suction line, introducing it into a fire detector through a connection line; measuring a smoke concentration in real-time using a measurement portion of the air suction-type fire detector; introducing the smoke initially drawn through any one of the plurality of suction holes into the air suction-type fire detector when a fire breaks out; determining an outbreak of fire when the smoke concentration exceeds a pre-set value, using a determination portion; opening an open and shut damper and operating a pump as a blower to discharge the air inside the suction line, by a control portion; shutting the open and shut damper again and operating the pump as a suction pump, by the control portion; and analyzing smoke concentration change graphs to detect an existence of fire and a fire location by the determination portion.

In addition, in the step of detecting an existence of fire and a fire location, the fire location is determined by matching a measured smoke concentration change graph with the smoke concentration change graphs depending on fire locations, stored in the database.

Further, the air suction-type fire detection method capable of early detection of a fire location through smoke concentration monitoring further includes a step of: transmitting to a user terminal the smoke concentration change graph displayed on a monitoring portion, and fire location information and information as to whether or not a fire breaks out determined in the fire detector, by a communication portion.

Advantageous Effects

According to an air suction-type fire detection system capable of early detection of a fire location through smoke concentration monitoring and a detection method thereof in accordance of the embodiment of the present disclosure, in respect to an air suction-type fire detection system for preventing fire in a chamber such as a freezing warehouse and an ESS room, it is capable of detecting fire based on smoke concentration change graphs and of identifying a fire location at the same time.

According to an air suction-type fire detection system capable of early detection of a fire location through smoke concentration monitoring and a detection method thereof in accordance of the embodiment of the present disclosure, it is capable of determining whether or not a fire breaks out by comparing and analyzing a smoke concentration change graph measured in real time and pre-stored and databased smoke concentration change graphs depending on fire locations and of identifying a fire location at the same time.

According to an air suction-type fire detection system capable of early detection of a fire location through smoke concentration monitoring and a detection method thereof in accordance of the embodiment of the present disclosure, it is capable of accurately detecting a fire location by: detecting fire when a smoke concentration becomes a set value or more; opening an open and shut damper to discharge smoke inside a suction line for accurately matching databased smoke concentration change graphs; operating an suction pump in a positive direction again to measure a smoke concentration change; and then comparing patterns and slopes of a measured smoke concentration change graph to those of smoke concentration change graphs depending on fire locations, stored in the database.

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings.

DETAILED DESCRIPTION

Figure 1A:
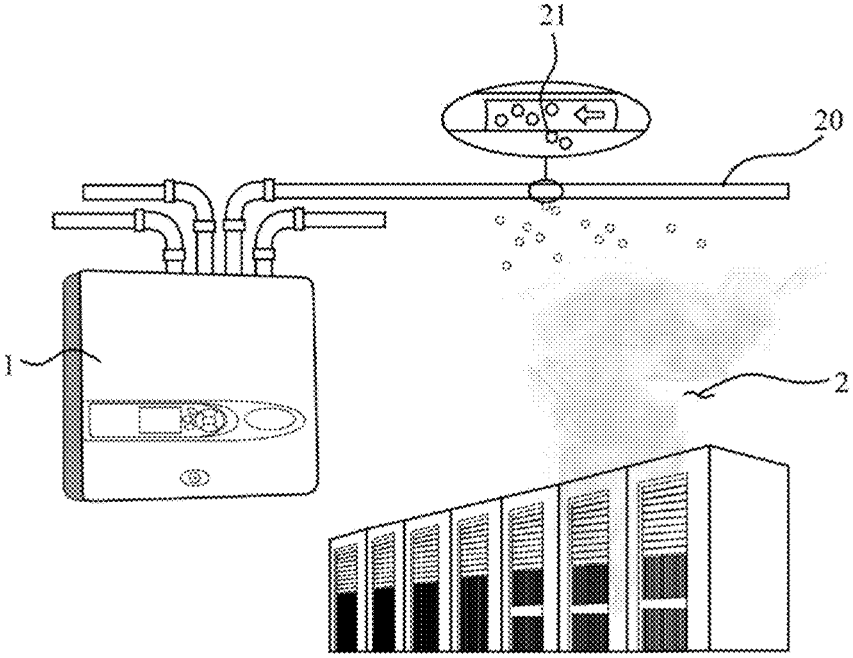
FIG. 1A and FIG. 1B show examples of an air suction-type fire detection system being applied to an ESS room.
Figure 1B:
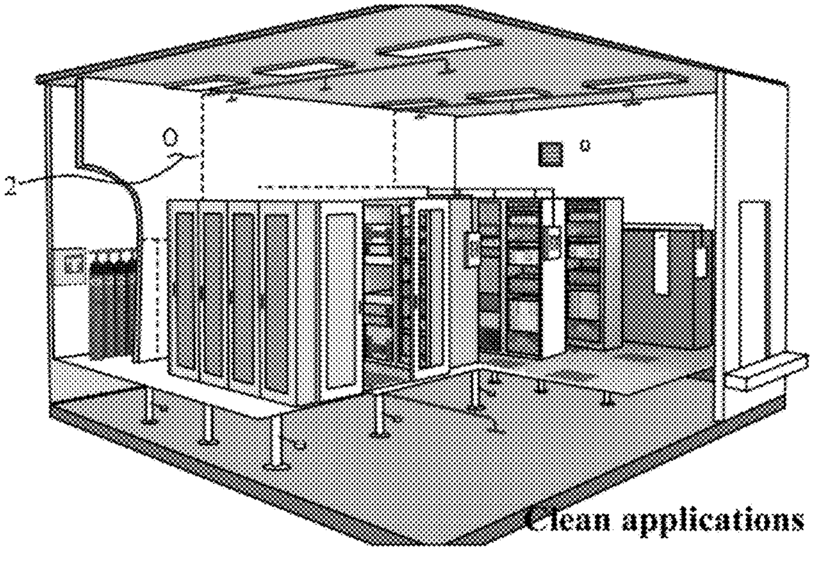
Figure 2:
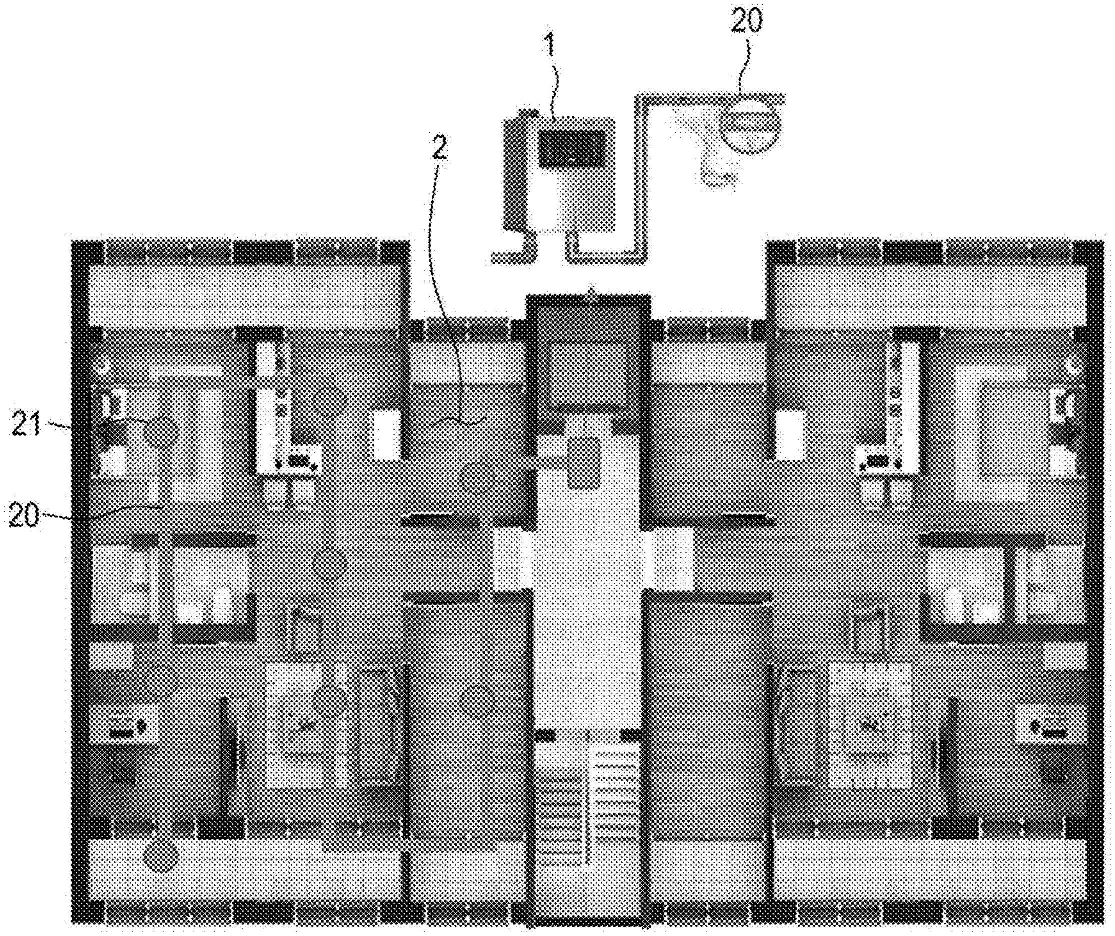
FIG. 2 shows an example of the same system being applied to a private house.

Hereinafter, the aforementioned aims, other aims, features and advantageous effects of the present disclosure will be understood easily referring to preferable embodiments related to the accompanying drawings. However, the present disclosure is not limited to embodiments described in this specification, and may be embodied into other forms. Preferably, the embodiments in this specification are provided in order to allow disclosed contents to be exhaustive and to communicate the concept of the present disclosure to those skilled in the art.

In this specification, when a certain element is placed on another element, this means that it may be formed directly thereon or that the third element may be interposed between them. Further, in the drawings, the thickness of an element may be overstated in order to explain the technical content thereof efficiently.

The embodiments described in this specification will explained with reference to a cross-sectional view and/or a plane view. In the drawings, the thickness of a film and a region may be overstated in order to explain the technical content thereof efficiently. Accordingly, the form of exemplary drawings for a fabrication method and/or an allowable error et cetera may be modified. Thus, the embodiments according to the present disclosure are not limited to specific forms illustrated herein, but may include variations in the form resulting from the fabrication method. For example, the region illustrated with perpendicular lines may have a form to be rounded or with a predetermined curvature. Thus, regions exemplified in the drawings have attributes, and shapes thereof exemplify specific forms rather than limiting the scope of the present disclosure. In the various embodiments of this specification, terms such as 'first' and 'second' et cetera are used to describe various elements, but these elements should not be limited to such terms. These terms are merely used to distinguish one element from others. The embodiments explained and exemplified herein may include complementary embodiments thereto.

The terms used in this specification is to explain the embodiments rather than limiting the present disclosure. In this specification, the singular expression includes the plural expression unless specifically stated otherwise. The terms, such as 'comprise" and/or "comprising" do not preclude the potential existences of one or more elements.

When describing the following specific embodiments, various kinds of specific contents are made up to explain the present disclosure in detail and to help understanding thereof. However, it will be apparent for those who have knowledge to the extent of understanding the present disclosure that the present disclosure can be used without any of these specific contents. In a certain case when describing the present disclosure, the content that is commonly known to the public but is largely irrelevant to the present disclosure is not described in order to avoid confusion.

Figure 4:
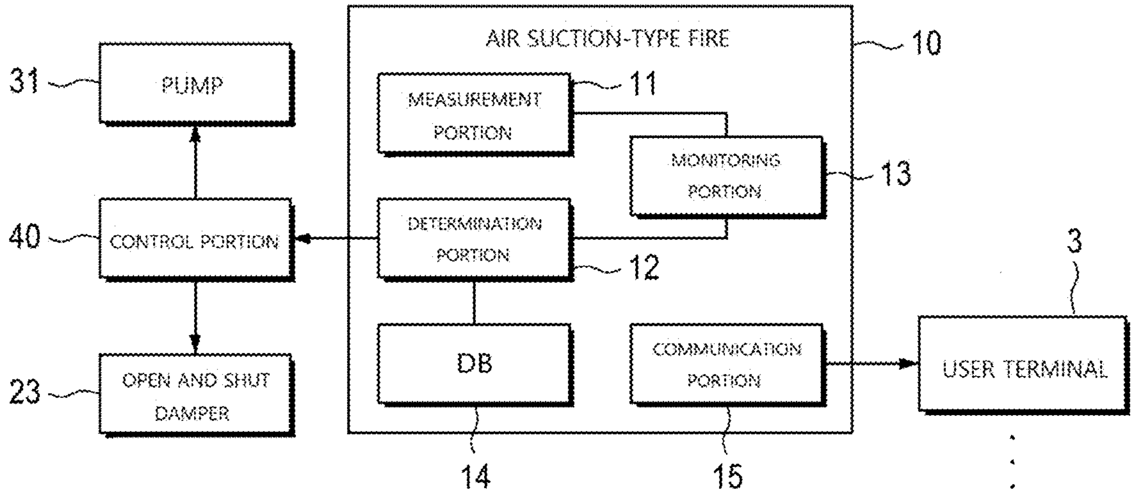
FIG. 4 is a block diagram of an air suction-type fire detection system capable of early detection of a fire location through smoke concentration monitoring, according to an embodiment of the present disclosure.
Figure 5A:
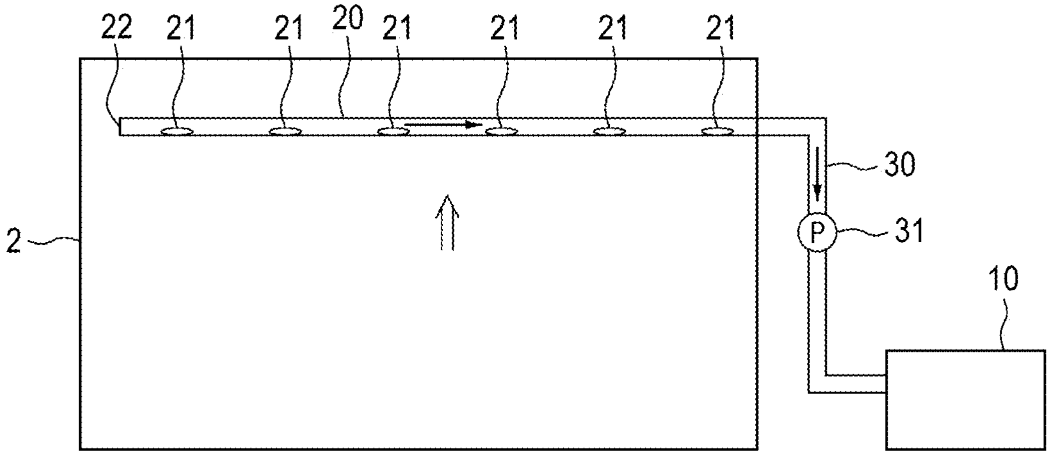
FIG. 5A is a schematic diagram of an air suction-type fire detection system capable of early detection of a fire location through smoke concentration monitoring, according to an embodiment of the present disclosure.

Hereinafter, the configuration and function of an air suction-type fire detection system 100 capable of early detection of a fire location through smoke concentration monitoring will be described. FIG. 4 is a block diagram of the air suction-type fire detection system 100 capable of early detection of a fire location through smoke concentration monitoring according to an embodiment of the present disclosure. FIG. 5A is a schematic diagram of an air suction-type fire detection system capable of early detection of a fire location through smoke concentration monitoring according to an embodiment of the present disclosure, and FIG. 5B is a schematic diagram of an air suction-type fire detection system capable of early detection of a fire location through smoke concentration monitoring in partitioned chambers according to an embodiment of the present disclosure.

Figure 5B:
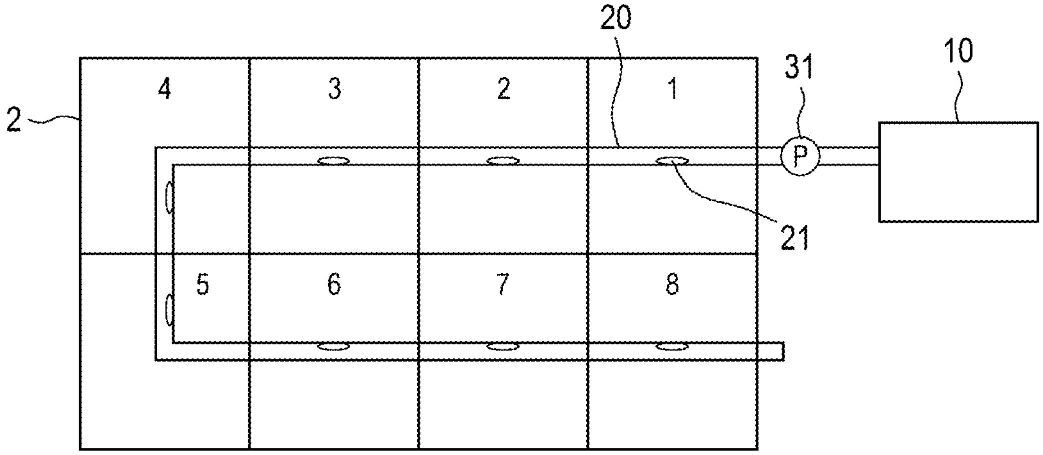
FIG. 5B is a schematic diagram of an air suction-type fire detection system capable of early detection of a fire location through smoke concentration monitoring in divided chambers, according to an embodiment of the present disclosure.

As shown in FIG. 4 and FIGS. 5A and 5B, it is seen that the air suction-type fire detection system 100 capable of identifying a fire location according to an embodiment of the present disclosure includes a suction line 20, a connection line 30, an air suction-type fire detector 10 and the like inside a chamber 2 needing fire detection.

As shown in FIG. 4, it is seen that an air suction-type fire detector 10 is fitted to the outside of the chamber 2 to draw air inside the chamber 2 and detect fire.

The suction line 20 is fitted to the inside of the chamber 2 to suck the air inside the chamber 2 in real time. Further, the connection line 30 links the suction line 20 and the fire detector 10.

Figure 3:
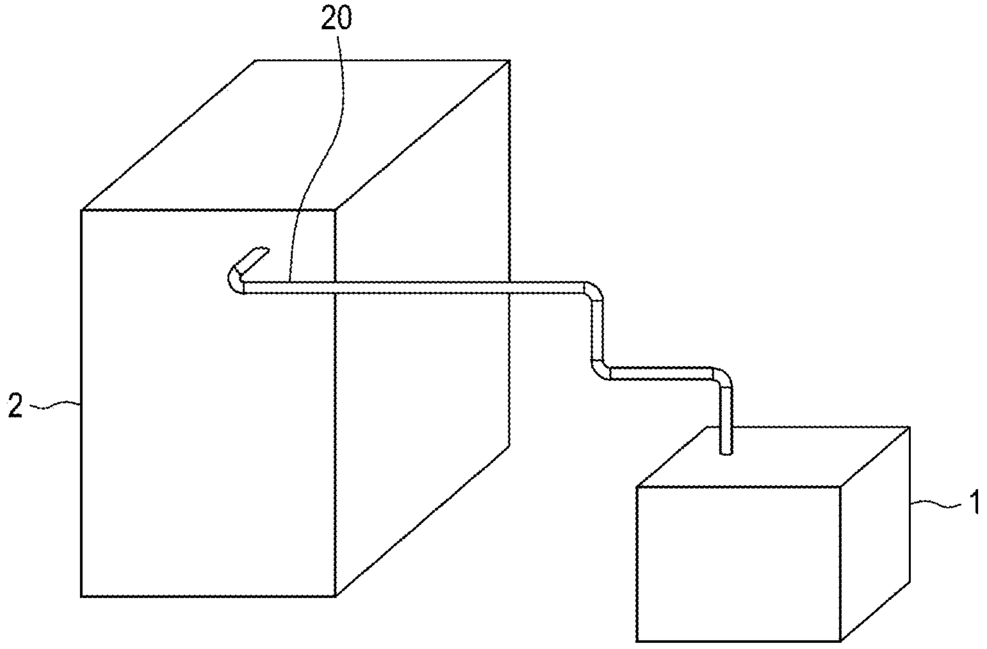
FIG. 3 shows a schematic diagram of an air suction-type fire detection system 1 installed in a freezing warehouse.

As shown in FIG. 3, a pump 31 is furnished on one side of the connection line 30, supplying power to draw air from inside the chamber 2 into the suction line 20.

The air suction-type fire detector 10 measures smoke concentration changes of the drawn air in real time to determine an existence of fire and a fire location.

As shown in FIGS. 5A and 5B, it is seen that the suction line 20 has an end configured with a closed surface and an outer surface on which a plurality of suction holes 21 are formed spaced apart from each other in a certain interval. Thus, the air inside a warehouse 2 flows into the suction line 20 through the plurality of suction holes 21 and then into the air suction-type fire detection 10 through the connection line 30.

As shown in FIG. 4, it is seen that the air suction-type fire detector 10 according to the present disclosure includes a measurement portion 11 that measure a smoke concentration in the air drawn in real time and a determination portion 12 that determines an existence of fire and a fire location based on a smoke concentration change graph measured in the measurement portion 11.

This smoke concentration change graph has different slope and pattern depending on a position of the suction hole 21 into which smoke is initially drawn according to a fire location. In other words, as the position of the suction hole 21 into which smoke is initially drawn is further away from the closed surface 22, a slope value in the smoke concentration becomes higher.

When smoke is introduced through a suction hole 21 adjacent to the closed surface 22, the smoke is diluted with the air introduced through another suction hole 21. Thus, a slope value in the change of smoke concentration, measured in the air suction-type fire detector 10 is small. On the other hand, as the position of suction hole 21 becomes further away from the closed surface, the amount of the air to be diluted after inflow of a fire smoke becomes smaller. Thus, a slope value in the smoke concentration changes becomes increased.

Therefore, the determination portion 12 may determine an existence of fire based on a value of smoke concentration, and may also identify a fire location based on a slope value and pattern of such a smoke concentration change graph.

Further, the air suction-type fire detector 10 according to an embodiment of the present disclosure may include a monitoring portion 13 that displays a smoke concentration change graph measured in real time, and a database 14 that stores pre-measured smoke concentration change graphs depending on fire locations and creates a database.

In addition, the determination portion 12 matches the measured smoke concentration change graph with the smoke concentration change graphs depending on fire locations stored in the database 14 to determine a fire location.

The graphs showing changes in smoke concentration depending on fire locations, which are stored in the database 14, depict a state where the smoke is initially drawn into a plurality of respective suction holes.

In other words, the smoke concentration change graphs for states where smoke is initially drawn into a plurality of respective suction holes 21 are stored in advance and then converted into data.

Then, theses databased smoke concentration change graphs depending on fire locations are matched with the measured smoke concentration change graph to determine an actual location of a fire by retrieving the corresponding fire location value from any identical or similar graph stored in the database.

Figure 6A:
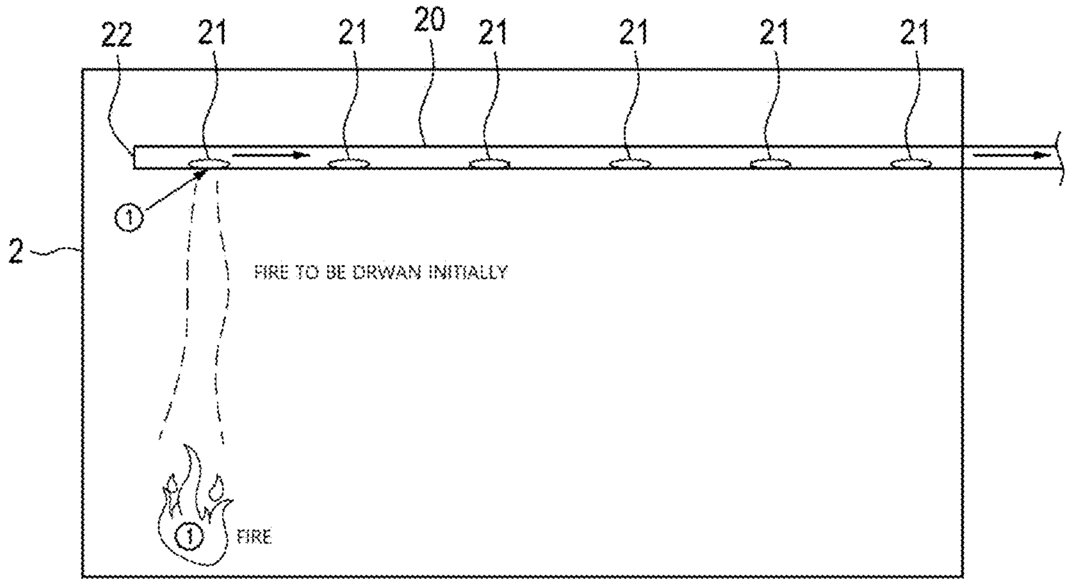
FIG. 6A is a schematic diagram showing a state where smoke is initially drawn through a suction hole ① when a fire breaks out at a location ①, according to an embodiment of the present disclosure.
Figure 6B:
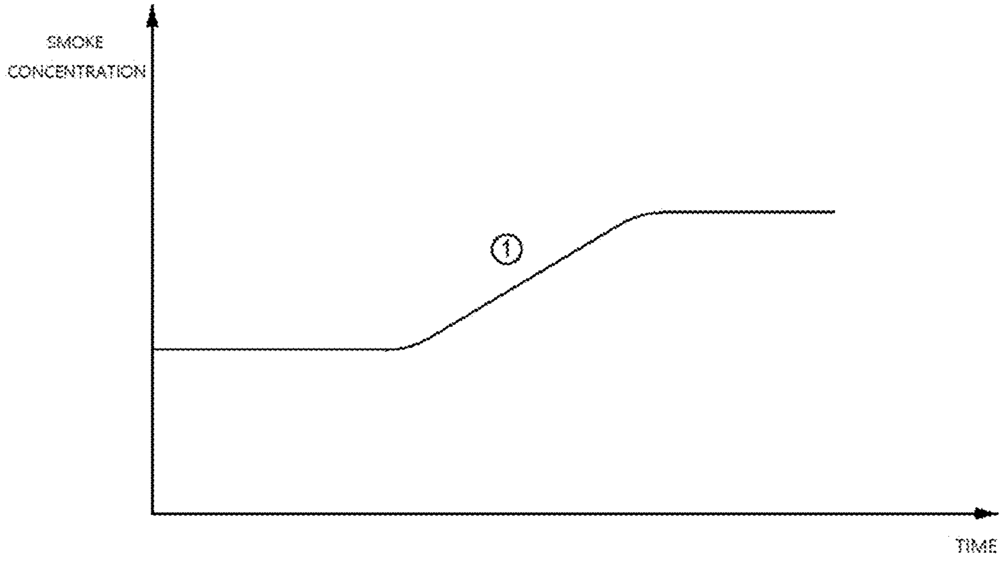
FIG. 6B is a smoke concentration change graph to be measured in the air suction-type fire detector in the state as shown in FIG. 6A.

FIG. 6A is a schematic diagram showing a state that smoke is initially drawn through a suction hole 21 ① when a fire breaks out at a location ① according to an embodiment of the present disclosure. FIG. 6B is a smoke concentration change graph to be measured in the air suction-type fire detector 10 in the state as shown in FIG. 6A.

Figure 7A:
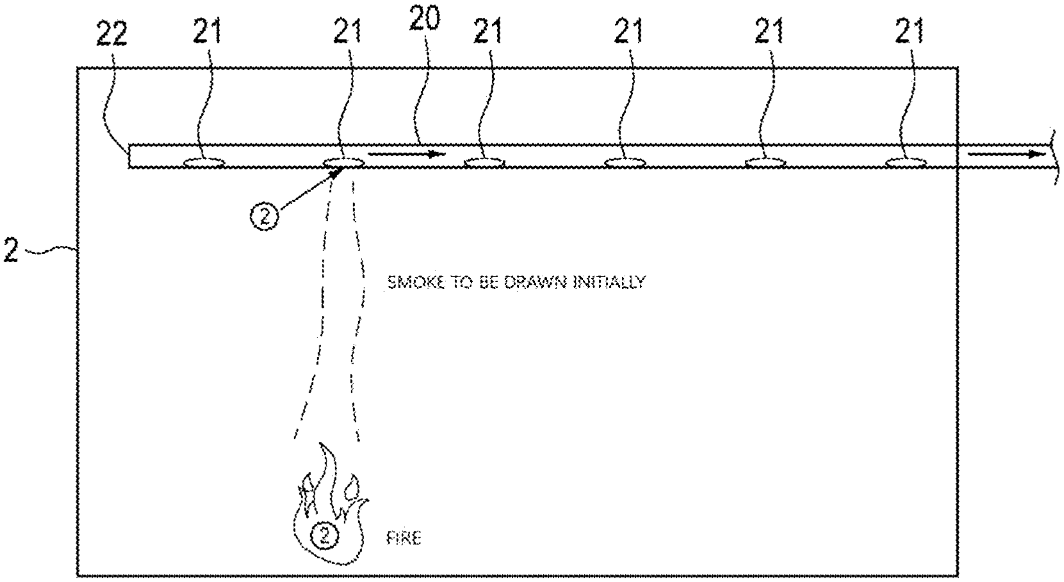
FIG. 7A is a schematic diagram showing a state that smoke is initially drawn through a suction hole ② when a fire breaks out at a location ②, according to an embodiment of the present disclosure.
Figure 7B:
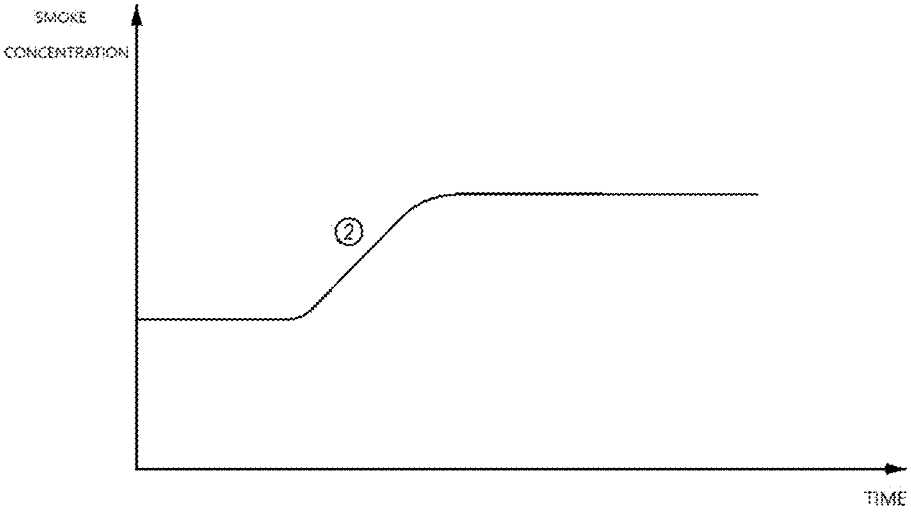
FIG. 7B is a smoke concentration change graph measured in the air suction-type fire detector in the state as shown in FIG. 7A.

FIG. 7A is a schematic diagram showing a state that smoke is initially drawn through a suction hole 21 ② when a fire breaks out at a location ② according to an embodiment of the present disclosure. FIG. 7B is a smoke concentration change graph to be measured in the air suction-type fire detector 10 in the state as shown in FIG. 7A.

Figure 8A:
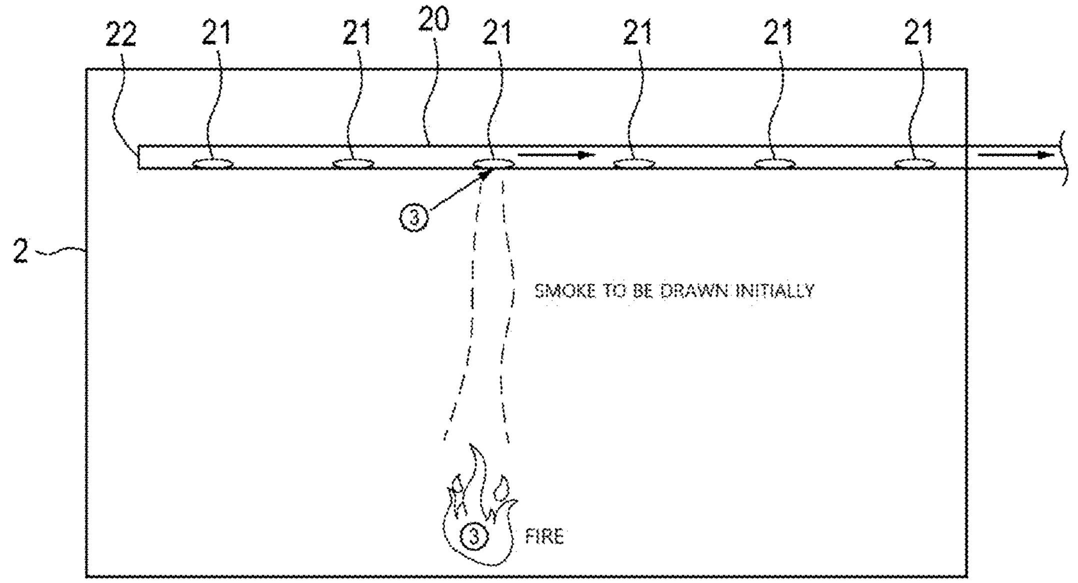
FIG. 8A is a schematic diagram showing a state that smoke is initially drawn through a suction hole ③ when a fire breaks out at a location ③, according to an embodiment of the present disclosure.
Figure 8B:
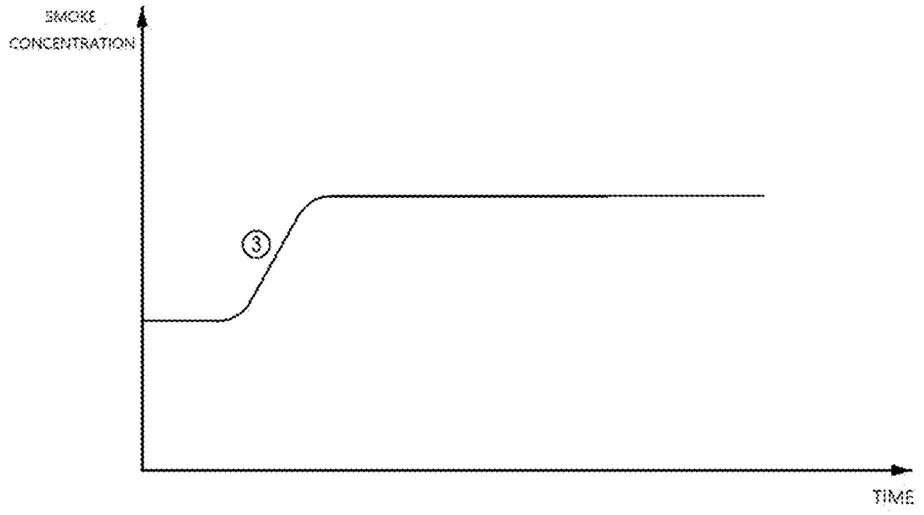
FIG. 8B is a smoke concentration change graph measured in the air suction-type fire detector in the state as shown in FIG. 8A.

FIG. 8A is a schematic diagram showing a state that smoke is initially drawn through a suction hole 21 ③ when a fire breaks out at a location ③ according to an embodiment of the present disclosure. FIG. 8B is a smoke concentration change graph measured in the air suction-type fire detector 10 in the state as shown in FIG. 8A.

Figure 9:
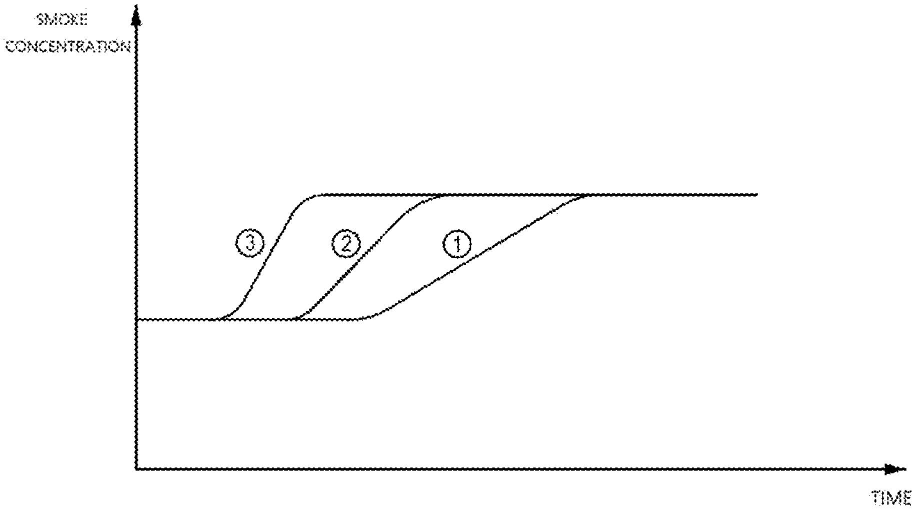
FIG. 9 is a smoke concentration change graph depending on a fire location, pre-stored in the database according to an embodiment of the present disclosure.

FIG. 9 is a smoke concentration change graph depending on a fire location, pre-stored in the database 140 according to an embodiment of the present disclosure.

As shown in FIG. 9, it is seen that smoke concentration change graphs depending on fire locations are stored in the database 14. That is, graphs of smoke concentration changes for states where smoke is initially drawn into the position ①, the position ② and the position ③ respectively are stored. These smoke concentration change graphs for all of the suction holes 21 are stored and then converted into data.

The suction pump 31 is operated to introduce air inside the warehouse 2 through the suction hole 21 of the suction line 20 for introduction thereof into the air suction-type fire detector 10 through the connection line 30.

Then, the measurement portion 11 of the air suction-type fire detector 10 measures smoke concentrations in real time.

When a fire breaks out, smoke is initially drawn through any one of the plurality of suction holes 21 and then flows into the air suction-type fire detector 10.

Then, the determination portion 12 analyzes smoke concentration change graphs to detect an existence of fire and a fire location. That is, the determination portion 12 matches a measured smoke concentration change graph with the smoke concentration change graphs depending on fire locations, stored in the database 14 to determine the fire location.

That is, When a smoke concentration change graph, such as the one shown in FIG. 6B, is measured, it is matched with the smoke concentration change graph that corresponds to a fire location, as shown in FIG. 9, to determine the location of the fire as position ①. Further, when a graph, such as the one shown in FIG. 7B is measured, it is matched with the smoke concentration change graph that corresponds to a fire location as shown in FIG. 9 to determine the location of the fire as position ②. Yet further, when a smoke concentration change graph, such as the one shown in FIG. 8B is measured, it is matched with the smoke concentration change graph that corresponds to a fire location, as shown in FIG. 9 to determine the location of the position ③.

Figure 10:
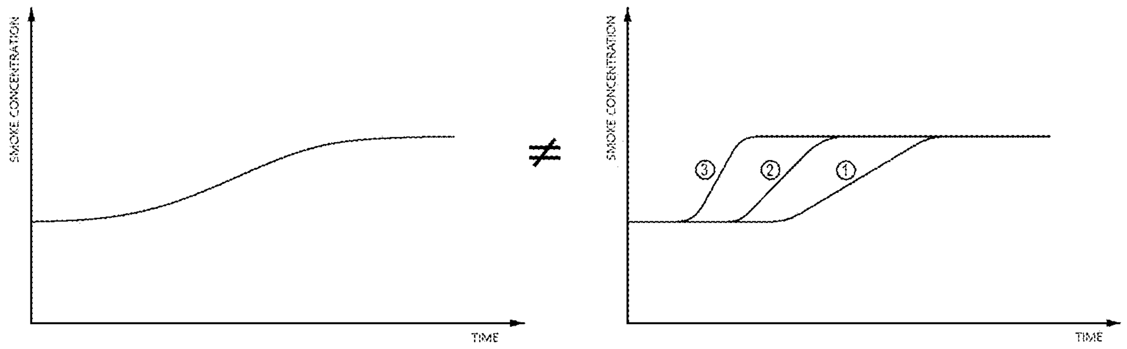
FIG. 10 shows comparison between a smoke concentration change graph measured in real time and a smoke concentration change graph depending on a fire location, pre-stored in the database, according to an embodiment of the present disclosure.

FIG. 10 shows comparison between a smoke concentration change graph measured in real time and a smoke concentration change graph depending on a fire location, pre-stored in the database according to an embodiment of the present disclosure.

As shown in FIG. 10, it is seen that when a fire breaks out actually at a particular location, a real-time smoke concentration change graph displayed on the monitoring portion 13 may not match the smoke concentration change graphs that correspond to fire locations, which are stored in the database 14. This is due to the fact that it depends on differences in a fire outbreak speed, an ignition source and the like, and circumstances.

To address this issue, according to the present disclosure, when the measured smoke concentration exceeds a preset concentration value, the determination portion 12 identifies that fire has broken out. At this time, a control portion 40 controls an open and shut damper 23 furnished to an end of the suction line 20 to be opened and a pump 31 to be rotated in a reverse direction and operated as a blower to completely discharge the air inside the suction line.

Figure 11A:
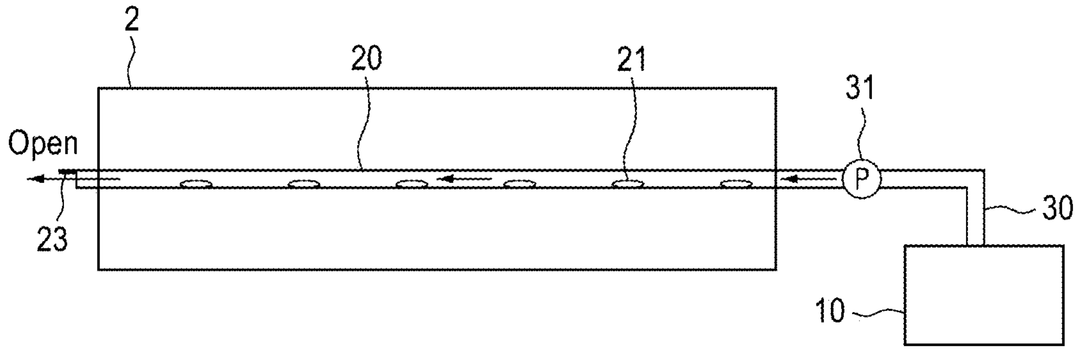
FIG. 11A is a schematic diagram showing a state where the open and shut damper is opened when a smoke concentration exceeds a certain set concentration, and the pump is operated as a blower to discharge smoke inside the suction line, according to an embodiment of the present disclosure.

FIG. 11A is a schematic diagram showing a state where the open and shut damper 23 is opened when a smoke concentration exceeds a certain set concentration, and the pump 31 is operated as a blower to discharge smoke inside the suction line 20, according to an embodiment of the present disclosure.

The damper 23 is opened for a set period of time and operated as a blower. Then, the control portion 40 closes the damper 23 and operates the pump 31 as a suction pump. The determination portion 12 compares and matches the smoke concentration change graph measured from the current time with the smoke concentration change graphs that correspond to fire locations stored in the database 14 in order to determine the location of the fire.

Figure 11B:
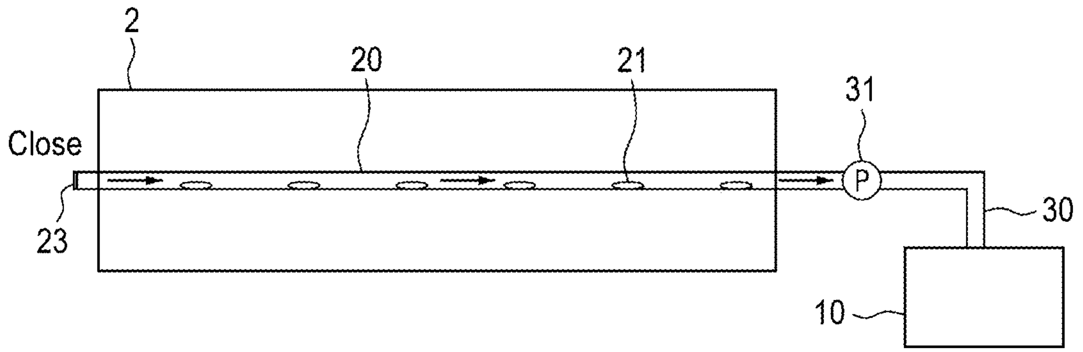
FIG. 11B is a schematic diagram showing a state that the open and shut damper is closed again, which was opened for discharging smoke inside the suction line, and the pump is operated again as a suction pump, according to an embodiment of the present disclosure.

FIG. 11B is a schematic diagram showing a state where the open and shut damper 23 is closed again, which was opened for discharging smoke inside the suction line 20 as shown in FIG. 11A, and the pump is operated again as a suction pump again, according to an embodiment of the present disclosure.

Figure 12:
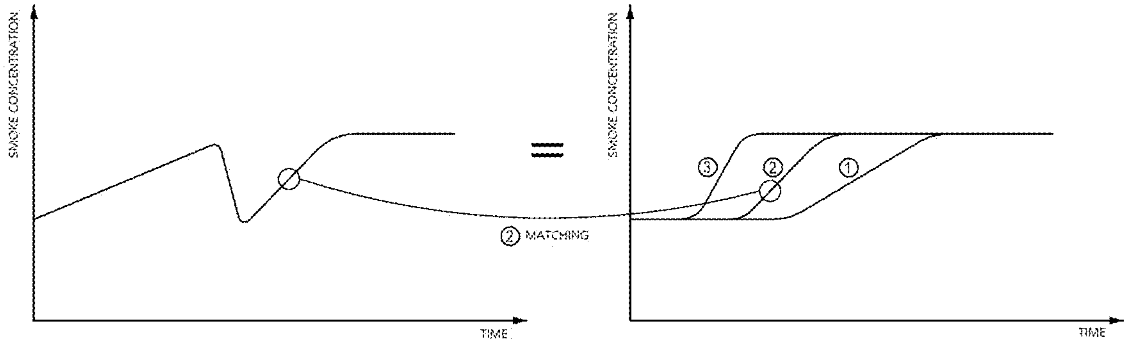
FIG. 12 shows a comparison between a smoke concentration change graph measured in real time and a smoke concentration change graph associated with a particular fire location stored in the database.

FIG. 12 shows a comparison between a smoke concentration change graph measured in real time and a smoke concentration change graph associated with a particular fire location stored in the database 14, according to a scenario of FIGS. 11A and 11B.

As shown in FIG. 12, as the open and shut damper 23 is controlled to open and the pump 31 is rotated in a reverse direction to be operated as a blower to completely discharge the air inside the suction line 20, a smoke concentration is sharply decreased. The damper 23 is opened for a set period of time and operated as a blower. Then, the control portion 40 closed the damper 23 and operates the pump 31 as a suction pump. When the determination portion 12 compares and matches the smoke concentration change graph measured from the current time with the smoke concentration change graphs that correspond to fire locations stored in the database 14 to determine the location of the fire, it is capable of accurately identifying a fir location by matching with the smoke concentration change graph that corresponds to on a fire location.

Further, the configuration and method of the embodiments as described above are not restrictively applied to the aforementioned apparatus and method. The whole or part of the respective embodiments may be selectively combined so as to make various modifications of the embodiments.

FIGURE REFERENCE NUMBERS

1: a prior air suction-type fire detection system
2. a chamber needing fire detection
3. a user terminal
10. an air suction-type fire detector
11. a measurement portion
12. a determination portion
13. a monitoring portion
14 database
15. a communication unit
20 a suction line
21. a suction hole
22. a closed surface
23. an open and shut damper
30. a connection line
31. a pump
40. a control portion
100. an air suction-type fire detection system capable of early detection of a fire location through smoke concentration monitoring

The invention claimed is:

1. An air suction-type fire detection system capable of early detection of a fire location through smoke concentration monitoring, the air suction-type fire detection system comprising:

an air suction-type fire detector that is fitted to the outside of a chamber needing fire detection and detects fire through an inflow of air inside a warehouse;

a connection line that connects on a first end to the air suction-type fire detector;

a suction line with an outer surface that has a plurality of suction holes spaced apart from each other at a certain interval, and that is fitted to the inside of the warehouse and sucks air inside the warehouse in real time;

a pump that is connected between a second end of the connection line and a first end of the suction line, and which supplies power to draw air from inside the warehouse into the suction line;

an open and shut damper connected to a second end of the suction line;

wherein:

the air suction-type fire detector discharges smoke from inside the suction line when a smoke concentration exceeds a set concentration value, sucks air again through the suction line and then determines an existence of fire and the fire location by measuring a change in a smoke concentration in the drawn air in real time;

the air suction-type fire detector comprises:

a measurement portion that measures a smoke concentration in air to be drawn in real time;

a determination portion that determines the existence of the fire and the fire location based on a smoke concentration change graph measured in the measurement portion, wherein the smoke concentration change graph is measured, which has a different slope depending on a position of one suction hole into which smoke is initially drawn, and wherein the one suction hole is one of the plurality of suction holes;

a monitoring portion that displays the smoke concentration change graph in real time; and a database that stores pre-measured smoke concentration change graphs depending on the fire locations stored in the database and then converted into data, wherein the pre-measured smoke concentration change graphs stored in the database are those in a state that the smoke is initially drawn into the plurality of suction holes, respectively;

wherein the determination portion matches the measured smoke concentration change graph with the pre-measured smoke concentration change graphs depending on the fire locations, stored in the database to determine the fire location;

when a smoke concentration measured in the measurement portion exceeds a pre-set concentration value, the determination portion determines that the fire exists, a control portion controlling the open and shut damper to open, the pump to be operated as a blower to discharge smoke inside the suction line and the pump to be operated as a suction pump again; and the determination portion compares the smoke concentration change graph measured from the time that the suction pump has been operated again with the pre-measured smoke concentration change graphs depending on fire locations stored in the database, and determines the fire location.

2. The air suction-type fire detection system capable for early detection of the fire location through smoke concentration monitoring of claim 1, the system further comprising:

a communication unit that transmits to a user terminal the smoke concentration change graph measured in the monitoring portion and displayed on the monitoring portion, and that transmits fire location information and information as to whether or not the fire exists as determined by the air suction-type fire detector.

3. An air suction-type fire detection method capable of early detection of a fire location through smoke concentration monitoring, the fire detection method using an air suction-type fire detector, wherein the air suction-type detector is connected to a pump by a connection line, the pump further connected to a first end of a suction line, and the second end of the suction line connected to an open and shut damper; comprising steps of:

storing smoke concentration change graphs depending on fire locations for respective states where smoke is initially drawn into each suction hole in a plurality of suction holes formed on the suction line and creating a database of pre-measured smoke concentration change graphs;

operating the pump as a suction pump to suck in air inside a chamber through the suction holes of the suction line, introducing the air into the air suction-type fire detector through the connection line;

measuring a smoke concentration in real-time using a measurement portion of the air suction-type fire detector;

introducing in real time the smoke initially drawn through any one of the plurality of suction holes into the air suction-type fire detector when a fire breaks out;

determining an outbreak of fire when the measured smoke concentration exceeds a pre-set value, using a determination portion;

opening the open and shut damper and operating a pump as a blower to discharge the air inside the suction line, by a control portion;

shutting the open and shut damper again and operating the pump as the suction pump, by the control portion; and analyzing the pre-measured smoke concentration change graphs to detect an existence of fire and the fire location by the determination portion, wherein in the step of analyzing the premeasured smoke concentration change graphs to detect the existence of fire and the fire location, the fire location is determined by matching a measured smoke concentration change graph, which is measured in the measurement portion and has a different slope depending on a position of the any oner of the suction holes into which smoke is initially drawn, with the pre-measured smoke concentration change graphs depending on fire locations, stored in the database.

4. The air suction-type fire detection method capable of early detection of the fire location through smoke concentration monitoring of claim 3, the fire detection method further comprising a step of:

transmitting, by a communication portion, to a user terminal the smoke concentration change graph, which is displayed on a monitoring portion, and transmitting fire location information and information as to whether or not the fire exists as determined by the air suction-type fire detector.

* * * * *